(12) United States Patent
Kim et al.

(10) Patent No.: US 10,374,837 B2
(45) Date of Patent: Aug. 6, 2019

(54) METHOD FOR MEASURING EFFECTIVE CHANNEL FOR MUST TRANSMISSION IN WIRELESS COMMUNICATION SYSTEM AND APPARATUS THEREFOR

(71) Applicant: LG ELECTRONICS INC., Seoul (KR)

(72) Inventors: Hyungtae Kim, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 30 days.

(21) Appl. No.: 15/737,971

(22) PCT Filed: Jul. 6, 2016

(86) PCT No.: PCT/KR2016/007322
§ 371 (c)(1),
(2) Date: Dec. 19, 2017

(87) PCT Pub. No.: WO2017/007238
PCT Pub. Date: Jan. 12, 2017

(65) Prior Publication Data
US 2018/0331859 A1    Nov. 15, 2018

Related U.S. Application Data

(60) Provisional application No. 62/219,099, filed on Sep. 15, 2015, provisional application No. 62/189,707, filed on Jul. 7, 2015.

(51) Int. Cl.
*H04L 25/02* (2006.01)
*H04L 5/00* (2006.01)
*H04L 25/03* (2006.01)
*H04W 72/04* (2009.01)
*H04L 1/00* (2006.01)
*H04W 76/27* (2018.01)

(52) U.S. Cl.
CPC ............ *H04L 25/0204* (2013.01); *H04L 1/00* (2013.01); *H04L 5/003* (2013.01); *H04L 5/0048* (2013.01);
(Continued)

(58) Field of Classification Search
CPC ....... H04L 25/0204; H04L 1/00; H04L 5/003; H04L 5/0051; H04L 25/03898;
(Continued)

(56) References Cited

U.S. PATENT DOCUMENTS 8,699,618 B2 * 4/2014 Park .................... H04J 13/0048
370/335
9,124,532 B2 * 9/2015 Chen ..................... H04B 7/024
(Continued)

FOREIGN PATENT DOCUMENTS

EP           2688221 A1    1/2014
KR   10-2011-0084818 A    7/2011
(Continued)

*Primary Examiner* — Tejis Daya
(74) *Attorney, Agent, or Firm* — Birch, Stewart, Kolasch & Birch, LLP

(57) ABSTRACT

Disclosed is a method for estimating a channel by a first terminal in a wireless communication system. Particularly, the method comprises the steps of: obtaining information associated with whether a first pre-coder for the first terminal and a second pre-coder for a second terminal are identical to each other; estimating, as a single effective channel, a first effective channel between a base station and the first terminal and a second effective channel between the base station and the second terminal when the first pre-coder and the second pre-coder are identical to each other; individually estimating the first effective channel and the second effective channel when the first pre-coder and the second pre-coder are different from each other.

12 Claims, 8 Drawing Sheets

(52) U.S. Cl.
CPC ............ *H04L 5/0051* (2013.01); *H04L 25/02* (2013.01); *H04L 25/03898* (2013.01); *H04W 72/042* (2013.01); *H04W 76/27* (2018.02)

(58) Field of Classification Search
CPC .... H04L 5/0048; H04L 25/02; H04W 72/042; H04W 76/27
See application file for complete search history.

(56) References Cited

U.S. PATENT DOCUMENTS

| | | | |
|---|---|---|---|
| 2008/0260059 A1* | 10/2008 | Pan | H04B 7/0417 375/260 |
| 2012/0118989 A1 | 5/2012 | Buescher et al. | |
| 2012/0314787 A1* | 12/2012 | Park | H04B 7/0417 375/260 |
| 2013/0107849 A1* | 5/2013 | Park | H04B 7/0417 370/329 |
| 2014/0079149 A1* | 3/2014 | Lee | H04B 7/0417 375/267 |
| 2014/0328422 A1* | 11/2014 | Chen | H04B 7/0639 375/267 |
| 2015/0063282 A1* | 3/2015 | Kim | H04B 7/063 370/329 |
| 2018/0220433 A1* | 8/2018 | Li | H04B 7/0452 |

FOREIGN PATENT DOCUMENTS

| | | |
|---|---|---|
| KR | 10-2012-0023962 A | 3/2012 |
| KR | 10-2014-0058976 A | 5/2014 |

* cited by examiner

FIG. 2
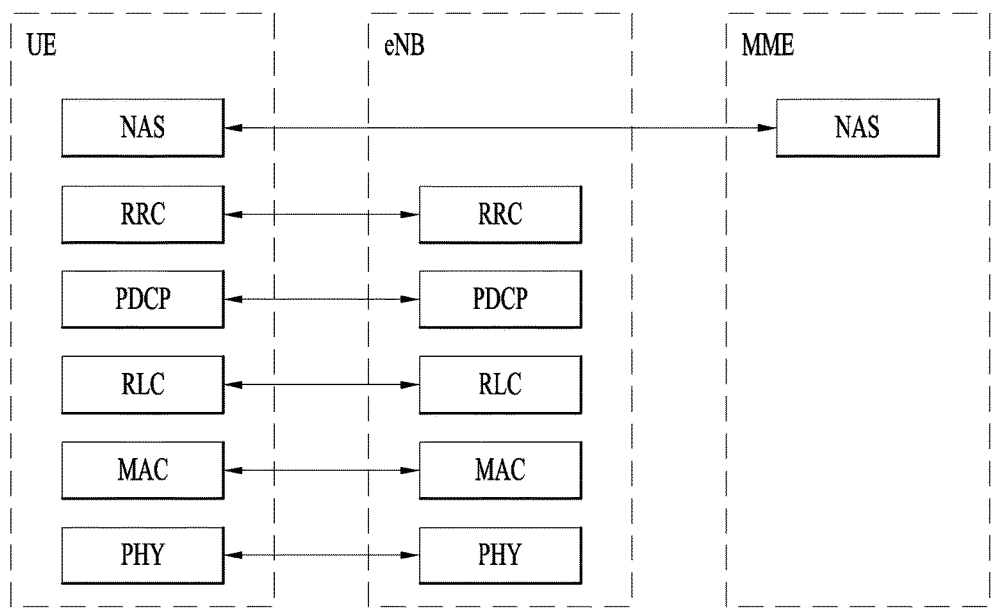
(a) Control-Plane Protocol Stack
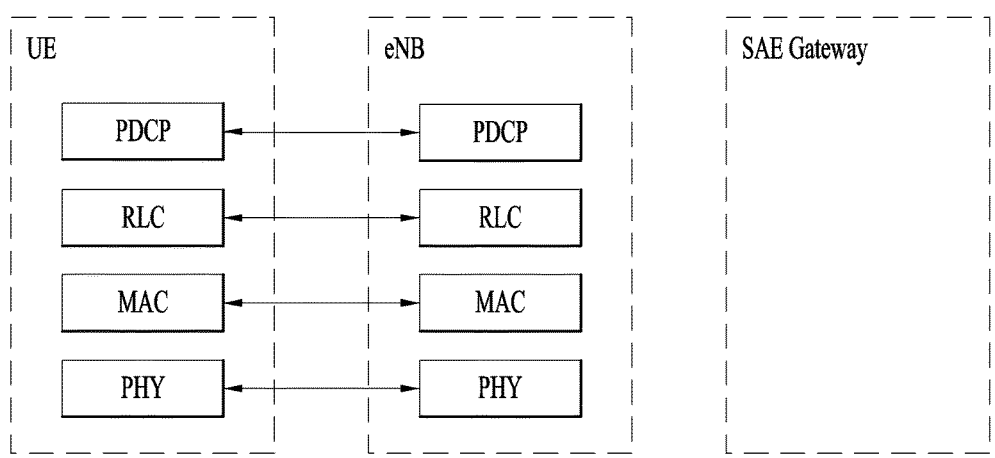
(b) User-Plane Protocol Stack

METHOD FOR MEASURING EFFECTIVE CHANNEL FOR MUST TRANSMISSION IN WIRELESS COMMUNICATION SYSTEM AND APPARATUS THEREFOR

CROSS REFERENCE TO RELATED APPLICATIONS

This application is the National Phase of PCT International Application No. PCT/KR2016/007322, filed on Jul. 6, 2016, which claims priority under 35 U.S.C. 119(e) to U.S. Provisional Application No. 62/189,707, filed on Jul. 7, 2015 and No. 62/219,099, filed on Sep. 15, 2015, all of which are hereby expressly incorporated by reference into the present application.

TECHNICAL FIELD

The present invention relates to a wireless communication system, and more particularly, to a method for measuring an effective channel for Multi-User Superposition Transmission (MUST) transmission in a wireless communication system and apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

Based on the above discussion, the present invention proposes a method for measuring an effective channel for MUST transmission in a wireless communication system and apparatus therefor.

Technical Solutions

In an aspect of the present invention, provided herein is a method for estimating a channel by a first user equipment (UE) in a wireless communication system, including: obtaining information on whether a first precoder for the first UE is identical to a second precoder for a second UE; when the first precoder is identical to the second precoder, estimating a first effective channel between an evolved node B (eNB) and the first UE and a second effective channel between the eNB and the second UE as a single effective channel; and when the first precoder is not identical to the second precoder, separately estimating the first effective channel and the second effective channel.

In this case, estimating the first and second effective channels as the single effective channel may include: obtaining information on a first reference signal for the first UE and information on a second reference signal for the second UE; and estimating the single effective channel using the first and second reference signals.

Preferably, the information on whether the first precoder is identical to the second precoder may be received from the eNB.

Alternatively, obtaining the information on whether the first precoder is identical to the second precoder may include: obtaining information on a first reference signal for the first UE and information on a second reference signal for the second UE; and when the same parameters are configured for the first and second reference signals, determining that the first precoder is identical to the second precoder.

More preferably, a signal for the first UE and a signal for the second UE may be transmitted using the same time and frequency resources. In addition, the first UE may be located near to the eNB, and the second UE may be located far from the eNB.

In this specification, a near UE and a far UE can be interchangeably expressed as an interference-cancelling UE and an interference-causing UE, respectively. In some cases, the far UE can cancel interference from the near UE. That is, the roles and operations of the near and far UEs can be exchanged.

In another aspect of the present invention, provided herein is a user equipment (UE) in a wireless communication system, including: a wireless communication module for transmitting and receiving signals to and from an evolved node B (eNB); and a processor for processing the signals. In this case, the processor may be configured to obtain information on whether a first precoder for the UE is identical to a second precoder for a different UE, estimate a first effective channel between the eNB and the UE and a second effective channel between the eNB and the different UE as a single effective channel when the first precoder is identical to the second precoder, and separately estimate the first effective channel and the second effective channel when the first precoder is not identical to the second precoder.

In this case, the processor may be configured to obtain information on a first reference signal for the UE and information on a second reference signal for the different UE and estimate the single effective channel using the first and second reference signals.

Preferably, the information on whether the first precoder is identical to the second precoder may be received from the eNB. Alternatively, the processor may be configured to obtain information on a first reference signal for the UE and information on a second reference signal for the different UE and determine that the first precoder is identical to the second precoder when the same parameters are configured for the first and second reference signals.

More preferably, a signal for the UE and a signal for the different UE may be transmitted using the same time and frequency resources. In addition, the UE may be located near to the eNB, and the different UE may be located far from the eNB.

Advantageous Effects

According to the present invention, it is possible to efficiently estimate an effective channel for MUST transmission in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

FIG. 2 is a diagram illustrating structures of a control plane and a user plane of a radio interface protocol between a UE and an evolved UMTS terrestrial radio access network (E-UTRAN) based on the 3GPP radio access network specification;

BEST MODE FOR INVENTION

Figure 1:
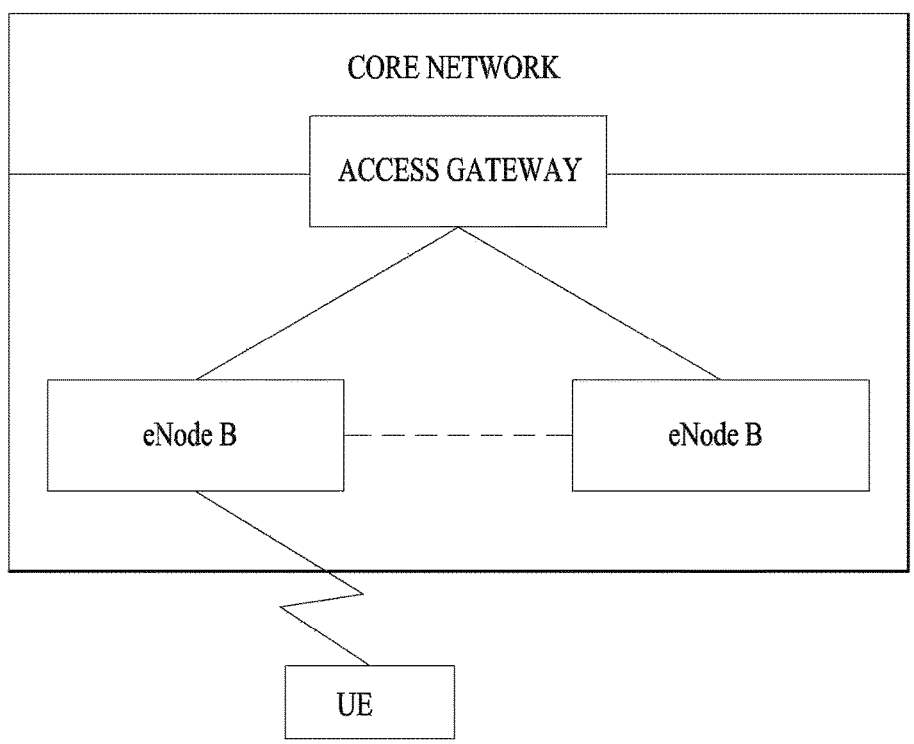
FIG. 1 is a diagram schematically illustrating a network structure of an evolved universal mobile telecommunications system (E-UMTS) as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A single cell managed by an eNB is configured to operate in one of the bandwidths of 1.25, 2.5, 5, 10, 15 and 20 Mhz and provide downlink (DL) or uplink (UL) transmission service to a plurality of UEs in the bandwidth. Different cells may be configured so as to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
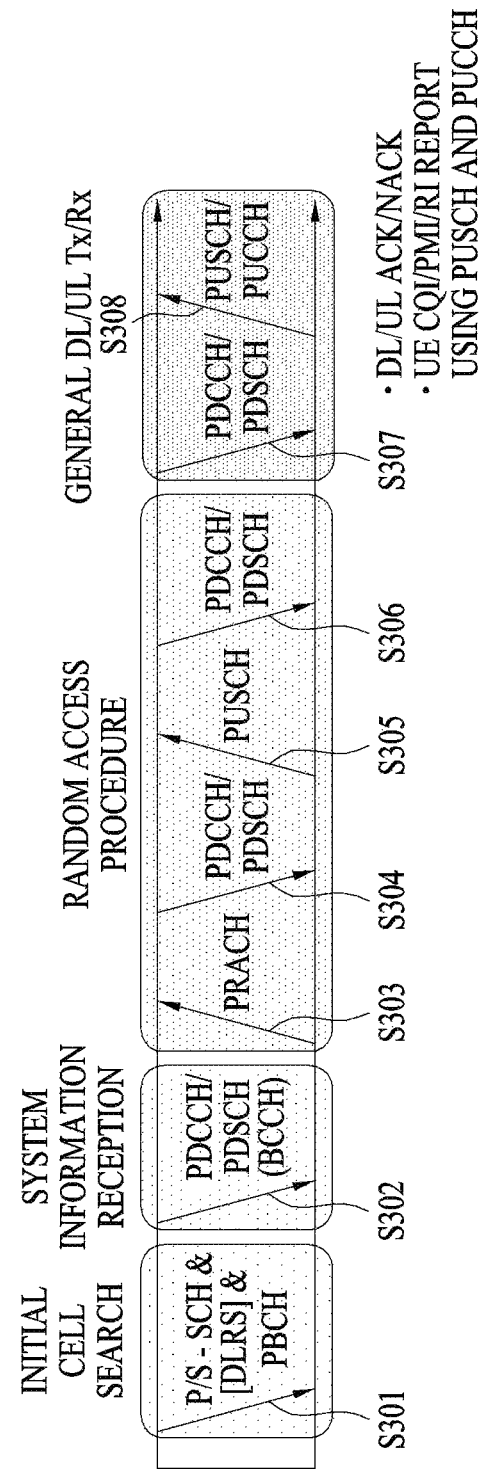
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
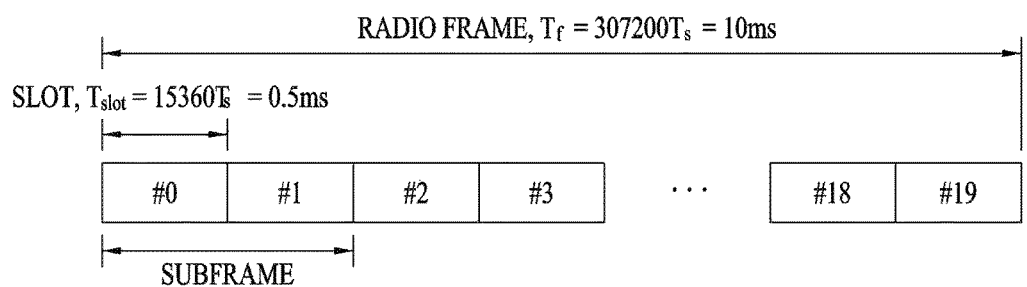
FIG. 4 is a diagram illustrating the structure of a radio frame used in a long term evolution (LTE) system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by $Ts=1/(15\ kHz \times 2048)=3.2552 \times 10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
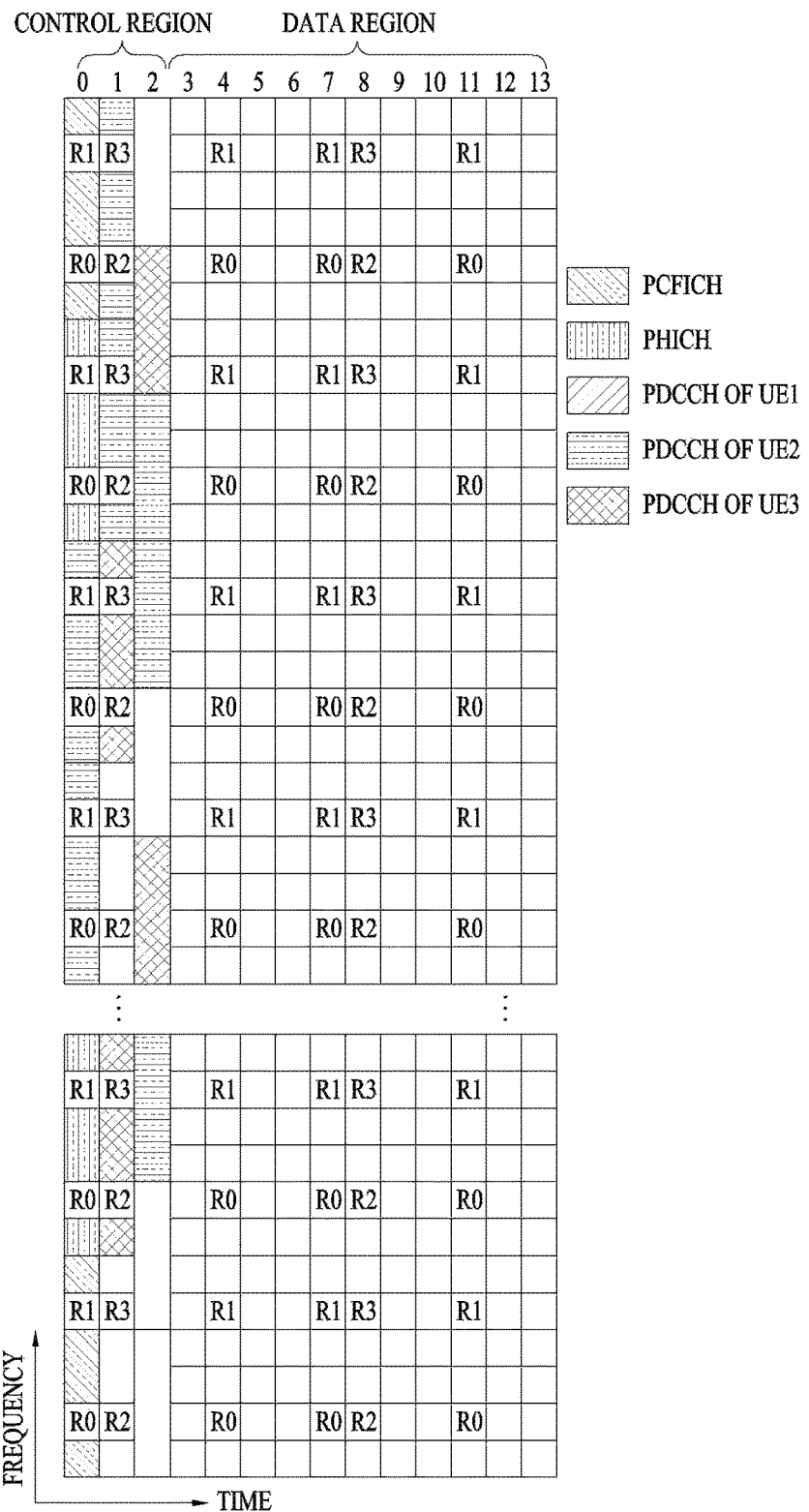
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted.

The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
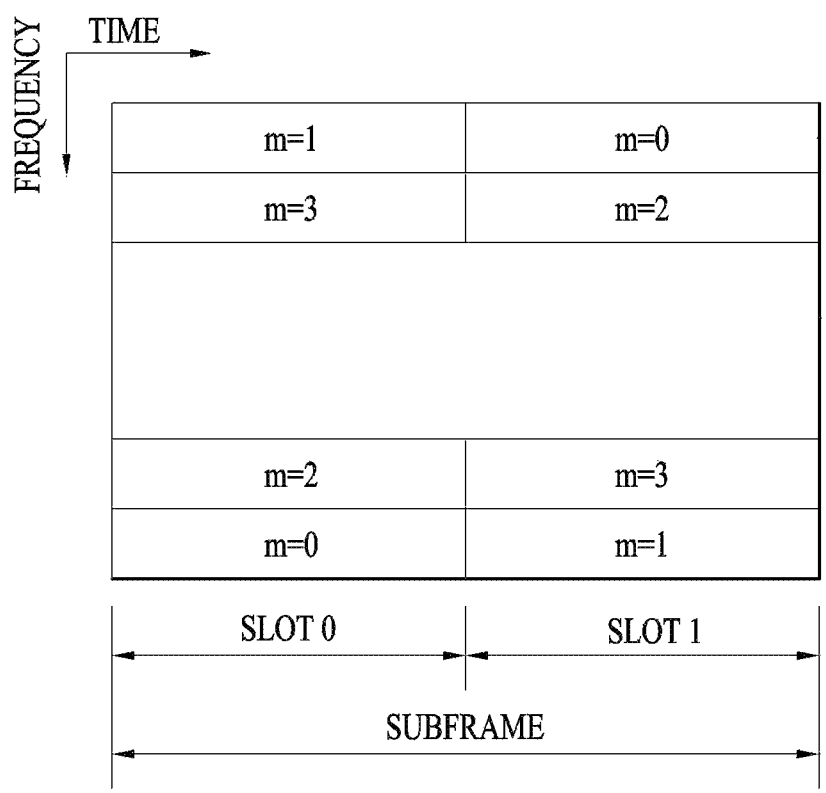
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

The present invention provides a method for performing signaling and specific operations required for an interference cancellation receiver in a multi-user superposition transmission (MUST) system. MUST refers to a multiple access scheme that may achieve high bandwidth efficiency by allocating a plurality of UEs to the same frequency-time resources using a preset power ratio and mitigating preset inter-user interference, basically based on the premise that a signal is transmitted to the interference cancellation receiver, in addition to time-frequency domain resource allocation of a legacy OFDMA system. MUST is under discussion as a significant candidate technology for a future 5th generation (5G) system.

Resource allocation of an eNB and interference cancellation of a UE are important techniques in the MUST system. Particularly, receivers may be classified into symbol level interference cancellation (SIC) receivers represented by a maximum likelihood (ML) receiver, and codeword level interference cancellation (CWIC) receivers represented by a minimum mea-square error (MMSE)-based linear CWIC (L-CWC) receiver and an ML-CWC receiver, depending on their interference cancellation schemes. A reception gain is different in a given environment according to each interference cancellation scheme. In general, an ML receiver and a CWIC receiver achieve high gains in proportion to the implementation complexity of a UE.

Figure 7:
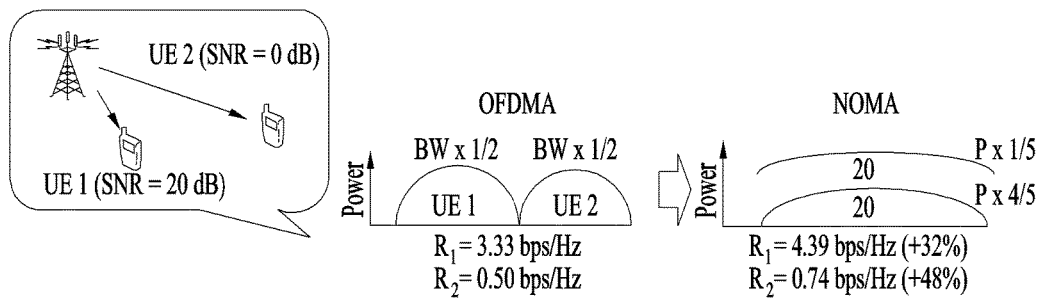
FIGS. 7 and 8 are conceptual views illustrating an interference cancellation scheme in a multi-user superposition transmission (MUST) system.
Figure 8:
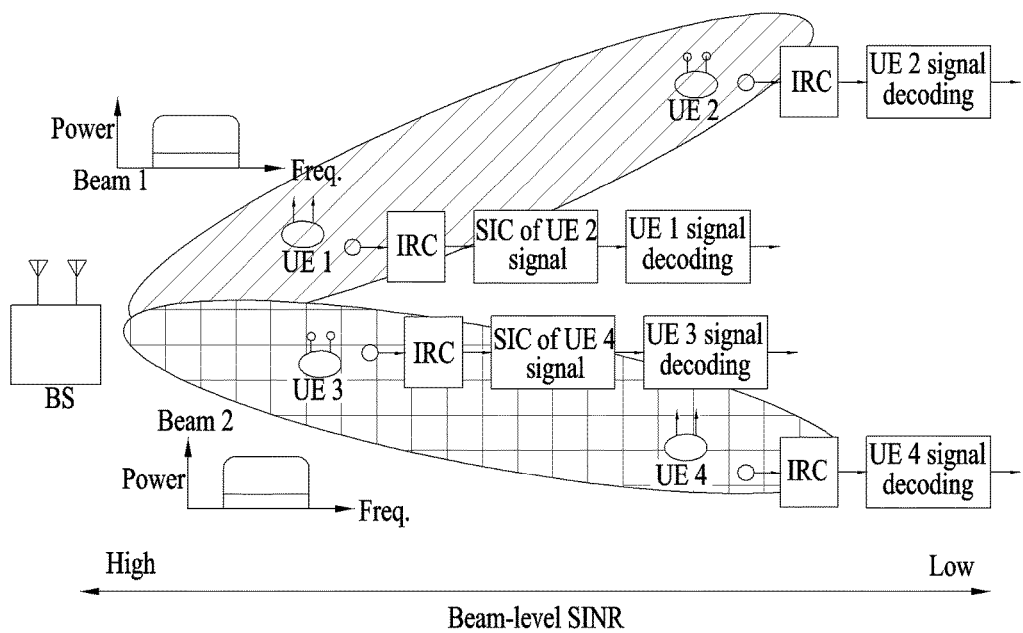

FIGS. 7 and 8 are conceptual views of an interference cancellation scheme in a MUST system.

FIG. 7 conceptually illustrates the difference between the legacy OFDMA system and the MUST system. Particularly, it is assumed in FIG. 7 that the signal to noise ratio (SNR) of a first UE (UE1) is 20 dB and the SNR of a second UE (UE2) is 0 dB.

Specifically, in the legacy OFDMA system, UE1 and UE2 receive DL signals with the same power, using equal halves of a bandwidth, that is, in different frequency bands. In this case, a data rate per frequency of UE1 is 3.33 bps/Hz and a data rate per frequency of UE2 is 0.5 bps/Hz. In the MUST system, each of UE1 and UE2 uses a total band. ⅘ of total transmission power is allocated to UE2, whereas ⅕ of the total transmission power is allocated to UE1. In this case, the data rate per frequency of UE1 is increased to 4.39 bps/Hz and the data rate per frequency of UE2 is increased to 0.74 bps/Hz.

FIG. 8 is a schematic view illustrating a signal reception operation in the MUST system. Specifically, an eNB transmits signals to which the same beamforming has been applied to UE1 and UE2 in the same time/frequency resources. In this case, although UE2 also receives a signal intended for UE1, the impact of the signal of UE1 is negligibly small because of a reception power difference. Thus, UE2 may decode a signal intended for UE2 simply by an interference rejection combining (IRC) algorithm. On the other hand, only after removing the transmission signal intended for UE2, that is, performing an SIC operation on the signal of UE2 in addition to the IRC algorithm, UE1 may decode the signal intended for UE1.

Likewise, the eNB transmits signals to which the same beamforming has been applied to a third UE (UE3) and a fourth UE (UE4) in the same time/frequency resources. In this case, although UE4 also receives a signal intended for UE3, the impact of the signal is negligibly small because of a reception power difference. Thus, UE4 may decode a signal intended for UE4 simply by the IRC algorithm. On the other hand, only after removing the transmission signal intended for UE4, that is, performing an SIC operation on the signal of UE4 in addition to the IRC algorithm, UE3 may decode the signal intended for UE3.

Before describing the present invention, a general effective channel estimation method will be explained. Assuming that the number of Tx antennas is $N_{tx}$ and the number of Rx antennas is $N_{rx}$, a downlink signal received by a UE in such an environment can expressed as shown in Equation 1.

$$r = HPx + N + I \qquad \text{[Equation 1]}$$

In Equation 1, H is an $N_{tx}$ by $N_{rx}$ downlink channel matrix, P is an $N_{rx}$ by n precoding matrix, and x is an n by 1 vector and indicates a signal that a UE intends to receive, that is, a desired signal. In addition, N is an $N_{rx}$ by 1 vector and indicates noise, and I is an $N_{rx}$ by 1 vector and indicates interference from other cells. In particular, n means a transmission rank of x. In Equation 1, an effective channel is defined as HP corresponding to the product of the downlink channel matrix and the precoding matrix.

When a UE operates in CRS (cell-specific reference signal) based transmission mode, the UE calculates HP by estimating H through a CRS and obtaining P from DCI. On the other hand, when a UE operates in DM-RS (demodulation reference signal) based transmission mode, the UE calculates each column vector of HP through a DM-RS. In other words, since H and P cannot be separately estimated, and a channel estimated from each DM-RS antenna port means each column vector of HP, the channel estimated from each DM-RS antenna port means an effective channel for each desired signal where spatial multiplexing (SM) is performed.

When the MUST transmission is applied, Equation 1 can be changed as shown in Equation 2.

$$r = HP_N x_N + HP_F x_F + N + I \quad \text{[Equation 2]}$$

In Equation 2, H is an N by $N_{rx}$ downlink channel matrix, $P_N$ is an $N_{rx}$ by $n_N$ precoding matrix for $X_N$, and $P_F$ is an $N^{rx}$ by $n_F$ precoding matrix for $X_F$. $X_N$ is an $n_N$ by 1 vector and indicates a desired signal of a near UE, and $X_F$ is an $n_F$ by 1 vector and indicates a desired signal of a far UE. In particular, $n_N$ means a transmission rank for the near UE's desired signal, and $n_F$ means a transmission rank for the far UE's desired signal. Additionally, N is an $N_{rx}$ by 1 vector and indicates noise, and I is an $N_{rx}$ by 1 vector and indicates interference from other cells.

Since a near UE should be able to decode both $X_N$ and $X_F$ (at a symbol level or codeword level), the near UE needs to correctly estimate an effective channel for a far UE signal, $HP_F$. In this case, according to MUST system operation methods, $P_N$ and $P_F$ can be scheduled such that they are restricted to have the same value at all times. Alternatively, $P_N$ and $P_F$ can be scheduled without any restriction.

When $P_N$ and $P_F$ are restricted to always have the same value, the near UE can estimate $HP_F$ relatively easily. That is, regardless of the CRS based transmission mode or the DM-RS based transmission mode, the near UE can obtain $HP_F$ without any additional calculation by calculating $HP_N$ as in the related art. However, when there is no restriction, the UE should perform additional calculation to estimate $HP_F$.

The present invention proposes an effective channel estimation method for a UE in an environment where there is no restriction that $P_N$ and $P_F$ are always equal to each other. In addition, the CRS based transmission mode and DM-RS based transmission mode are described.

<DM-RS Based Transmission Mode>

In Equation 2, a near UE uses different DM-RS antenna ports or different DM-RS sequences to estimate $HP_N$ and $HP_F$. For example, if both the rank ($n_N$) of a near UE signal and the rank ($n_F$) of a far UE signal is 1, the near UE estimates $HP_N$ through antenna port 7 using a DM-RS sequence, which is generated using a specific identifier (e.g., virtual cell ID (VCID), $n_{SCID}$, etc.) as a seed, and estimates $HP_F$ through antenna port 8 using a DM-RS sequence, which is generated using the same specific identifier (i.e., VCID and Nscid) as a seed.

For example, if the rank ($n_N$) of the near UE signal and the rank ($n_F$) of the far UE signal are 2 and 1, respectively, the near UE estimates $HP_N$ through antenna ports 7 and 8 using a DM-RS sequence generated using a specific VCID and nSCID as a seed, and estimates $HP_F$ through antenna ports 7 or 8 using a DM-RS sequence generated using a different VCID and nSCID as a seed.

When $HP_N$ and $HP_F$ are identical to each other, if a UE respectively estimates the two effective channels as in the above example, it may degrade estimation performance. That is, since far UE data power is significantly higher than near UE data power in the MUST transmission, a DM-RS transmitted through the $HP_F$ channel may cause significant interference to $HP_N$ estimation. Consequently, the accuracy of the $HP_N$ estimation may be degraded. Of course, if the near UE receives a DM-RS after cancelling a DM-RS of the far UE through DM-RS interference cancellation, the accuracy of the $HP_N$ estimation can be improved.

To solve this problem, when $P_N$ and $P_F$ are the same, a UE should estimate a single channel using both a DM-RS transmitted through the $HP_N$ channel and a DM-RS transmitted through the $HP_F$ channel. On the contrary, when $P_N$ and $P_F$ are not the same, a UE should estimate the two effective channels respectively. To perform such operations correctly, an eNB needs to signal to a UE whether $P_N$ and $P_F$ are the same.

The eNB can inform whether $P_N$ and $P_F$ are the same through RRC signaling or downlink control information (DCI). Alternatively, the eNB can inform it using CRC masking applied to DCI. For example, when $P_N$ and $P_F$ are the same, CRC masking is performed using a UE ID as in the related art. When $P_N$ and $P_F$ are different from each other, a prescribed offset may be added to the UE ID for CRC masking. Alternatively, the eNB may inform the UE of a value to be used for CRC masking except the UE ID. The UE attempts to perform a CRC check using the two types of CRC masking and then grasps a relationship between $P_N$ and $P_F$ corresponding to successful one.

When $P_N$ and $P_F$ are the same, a UE estimates one channel using both a DM-RS transmitted through the $HP_N$ channel and a DM-RS transmitted through the $HP_F$ channel. Specifically, channel estimation can be divided into channel phase estimation and channel magnitude estimation.

According to the current 3GPP standards, in the case of rank 1 and rank 2, data transmit power is equal to DM-RS transmit power. In the case of rank 3 or higher, there is a difference of 3 dB. Since near UE's data power and far UE's data power is asymmetrical due to MUST transmission characteristics, near UE's DM-RS power and far UE's DM-RS power is also asymmetrical. Thus, the magnitude of the $HP_N$ channel estimated from the near UE's DM-RS is different from that of the $HP_F$ channel estimated from the far UE's DM-RS. Consequently, when the channel magnitude is estimated using two DM-RSs, it is difficult to expect improvement in the accuracy.

On the other hand, when two DM-RSs are used for the channel phase estimation, its accuracy is expected to be improved. In order for a UE to improve the accuracy of the channel magnitude estimation, the eNB may inform the UE of a transmit power ratio between near UE data and far UE data. Alternatively, the near UE's DM-RS may be used for the channel magnitude estimation, and the far UE's DM-RS may be used for the channel phase estimation.

Mathematically speaking, when all elements of $P_N$ and $P_F$ are the same, $P_N$ and $P_F$ are considered to be the same because each of $P_N$ and $P_F$ is a matrix. However, in the present invention, even when some column vector of $P_N$ are equal to those of $P_F$, $P_N$ and $P_F$ are defined to be the same. For example, when $P_N$=[v1 v2] and $P_F$=[v1], $P_N$ and $P_F$ are expressed to be the same.

Since the eNB signals to the UE whether $P_N$ and $P_F$ are the same, the UE's channel estimation operation may be similar to DM-RS bundling. The DM-RS bundling is a scheme in which a eNB informs a UE that the same precoding is applied to K consecutive RBs to improve the UE's channel estimation accuracy. When the DM-RS bundling is applied, the UE can improve the channel estimation accuracy using DM-RSs in K consecutive RBs among its PDSCH resources. Similarly, when the near UE receives a DM-RS of the far UE having different DM-RS antenna ports or DM-RS sequences and a DM-RS of the near UE, and when the eNB signals that an effective channel for the DM-RS of the far UE is equal to that for the DM-RS of near UE, the near UE can improve the channel estimation accuracy using both the two DM-RSs.

TABLE 1

| One Codeword: Codeword 0 enabled, Codeword 1 disabled | | TWO Codewords: Codeword 0 enabled, Codeword 1 enabled | |
|---|---|---|---|
| Value | Message | Value | Message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

TABLE 2

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}$ = 0 (OCC = 2) | 0 | 2 layer, port 7-8, $n_{SCID}$ = 0 (OCC = 2) |
| 1 | 1 layer, port 7, $n_{SCID}$ = 1 (OCC = 2) | 1 | 2 layer, port 7-8, $n_{SCID}$ = 1 (OCC = 2) |
| 2 | 1 layer, port 8, $n_{SCID}$ = 0 (OCC = 2) | 2 | 2 layer, port 7-8, $n_{SCID}$ = 0 (OCC = 4) |
| 3 | 1 layer, port 8, $n_{SCID}$ = 1 (OCC = 2) | 3 | 2 layer, port 7-8, $n_{SCID}$ = 1 (OCC = 4) |
| 4 | 1 layer, port 7, $n_{SCID}$ = 0 (OCC = 4) | 4 | 2 layer, port 11, 13, $n_{SCID}$ = 0 (OCC = 4) |
| 5 | 1 layer, port 7, $n_{SCID}$ = 1 (OCC = 4) | 5 | 2 layer, port 11, 13, $n_{SCID}$ = 1 (OCC = 4) |
| 6 | 1 layer, port 8, $n_{SCID}$ = 0 (OCC = 4) | 6 | 3 layer, port 7-9 |
| 7 | 1 layer, port 8, $n_{SCID}$ = 1 (OCC = 4) | 7 | 4 layer, port 7-10 |
| 8 | 1 layer, port 11, $n_{SCID}$ = 0 (OCC = 4) | 8 | 5 layer, port 7-11 |
| 9 | 1 layer, port 11, $n_{SCID}$ = 1 (OCC = 4) | 9 | 6 layer, port 7-12 |
| 10 | 1 layer, port 13, $n_{SCID}$ = 0 (OCC = 4) | 10 | 7 layers, ports 7-13 |
| 11 | 1 layer, port 13, $n_{SCID}$ = 1 (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |

For the DM-RS based effective channel estimation, the near UE should know a DM-RS sequence transmitted through the $HP_N$ channel and antenna port thereof, and a DM-RS sequence transmitted through $HP_F$ channel and antenna port thereof. To this end, the following two methods can be considered.

(1) As the first method, information on the DM-RS transmitted through the $HP_N$ channel is received through DCI as in the related art, and information on the DM-RS transmitted through the $HP_F$ channel is detected through blind detection (BD). In this case, the UE creates 4 DM-RS seeds by combining two configured VCIDs and two nSCIDs (i.e., 0, 1) that can be configured, and generates a total of 4 DM-RS sequences using the seeds. (However, in the case of transmission mode 9 in the LTE system, since a VCID is equal to a physical cell ID (PCID), a total of two DM-RS seeds are generated.) Thereafter, for each DM-RS sequence, DM-RS BD is performed in each antenna port.

According to the current 3GPP LTE standards, Table 1 and Table 2 below are present as DM-RS related tables that can be defined in DCI. In addition, it is regulated that an eNB instructs a UE to use one of the two DM-RS tables through RRC signaling. Rel-13 table (specifically, Rel-13 table is a super set of Rel-12 table.

In this case, if the near UE and far UE respectively use different DM-RS tables for data reception, the near UE considers the probability that the far UE will use Table 2 and always performs BD on the DM-RS of the far UE by assuming antenna ports defined in Table 2 even through the near UE uses Table 1.

That is, since not only antenna ports 7 and 8 but also antenna ports 11 and 13 can be used even when the rank of an interference signal is equal to or lower than 2, it is preferable that the near UE performs BD on all of the antenna ports 7, 8, 11, and 13. Of course, in this case, BD complexity may be increased. To overcome the increased BD complexity, the eNB can not only limit DM-RS antenna ports of an interfering UE corresponding to an elimination target to the antenna ports 7 and 8 but also impose restrictions on scheduling such that the antenna ports 11 and 13 are not to be used. That is, the UE expects that interference that should be cancelled is not received through the antenna ports 11 and 13.

Alternatively, when use of Table 1 is determined, the UE performs BD on interference through the antenna ports 7 and 8 by assuming that its DM-RS table is equal to that used by the interfering UE. On the contrary, when use of Table 2 is determined, the UE performs BD on interference through all of the antenna ports 7, 8, 11 and 13.

When the eNB signals to the UE whether $P_N$ and $P_F$ are the same, if the UE detects the DM-RS information transmitted through the $HP_F$ channel by performing BD, the UE interprets that corresponding signaling is valid. If the UE fails to perform BD, the UE discards corresponding signaling. As described above, the UE may recognize whether there is far UE data, which is transmitted according to the MUST scheme, through BD. Alternatively, the eNB may inform the UE of presence or absence of the far UE data through signaling. When there is no far UE data, signaling indicating identity between effective channels is discarded. Hereinafter, particular operations of a UE when an eNB signals to the UE that $P_N$ and $P_F$ are the same will be described with reference to the following examples 1 to 3.

1) Example 1

When the rank $n_N$ of the near UE data is 1 and the rank $n_F$ of the far UE data is plural (e.g., 2), the near UE obtains information on $n_F$ DM-RSs through BD. To determine which DM-RS is transmitted through the same channel as its DM-RS antenna port, the UE compares the estimated $HP_F$ channel with the channel $HP_N$ estimated using its DM-RS antenna port only and then selects a far UE DM-RS corresponding to the same channel.

That is, the UE figures out $HP_F(i)$ with the highest correlation by calculating correlation of $HP_F(1)$, $HP_F(2) \ldots HP_F(n_F)$ and $HP_N$ and selects a DM-RS transmitted through the channel $HP_F(i)$. Here, $HP_F(1)$ means an $i^{th}$ column vector of $HP_F$. Thereafter, the UE improves the channel estimation performance using the selected DM-RS, which is transmitted through the same channel, and its DM-RS together.

2) Example 2

When the rank $n_N$ of the near UE data is plural (e.g., 2) and the rank $n_F$ of the far UE data is 1, the near UE obtains information on a single DM-RS through BD. To determine which DM-RS antenna port is used when this DM-RS is transmitted through the same channel, the UE compares the estimated $HP_F$ channel with the channel $HP_N$ estimated using its DM-RS antenna ports only and then selects a DM-RS antenna port corresponding to the same channel. That is, the UE figures out $HP_N(i)$ with the highest correlation by calculating correlation of $HP_N(1)$, $HP_N(2) \ldots HP_N(n_N)$ and $HP_F$ and selects a DM-RS transmitted through the channel $HP_N(i)$. Here, $HP_F(1)$ means an $i^{th}$ column vector of $HP_F$. Thereafter, the UE improves the channel estimation performance using the DM-RS transmitted through the same channel together.

Alternatively, the eNB may inform the near UE per DM-RS antenna port of the near UE that the far UE data transmitted through the same effective channel is present. That is, in the case of a DM-RS antenna port of $HP_N(i)$, the eNB may inform that the far UE data transmitted through the same effective channel is present. In the case of the remaining antenna ports, the eNB may inform that the far UE data transmitted through the same effective channel is not present. Thereafter, the UE improves the channel estimation performance using a DM-RS transmitted through the $HP_F$ channel and a DM-RS transmitted through the $HP_N(i)$ channel together.

3) Example 3

When the rank $n_N$ of the near UE data is plural (e.g., 2) and the rank $n_F$ of the far UE data is plural (e.g., 2), the near UE obtains information on $n_F$ DM-RSs through BD. To determine that which DM-RS is transmitted through the same channel as which DM-RS antenna port of the near UE, the UE compares the estimated $HP_F$ channel with the channel $HP_N$ estimated using its DM-RS antenna ports only and then selects a DM-RS antenna port corresponding to the same channel. That is, the UE selects a pair with correlation equal to or greater than a specific value (or the highest correlation) (i.e., $HP_F(i)$ and $HP_N(j)$) among pairs with correlation equal to or greater than another specific value by calculating correlation of $HP_F(1)$, $HP_F(2) \ldots HP_F(n_F)$ and $HP_N(1)$, $HP_N(2) \ldots HP_N(n_N)$. Thereafter, the UE improves the channel estimation performance using the DM-RS transmitted through the same channel together.

Alternatively, the eNB may inform the near UE per DM-RS antenna port of the near UE that the far UE data transmitted through the same effective channel is present. In this case, during the correlation calculation process, the near UE figures out DM-RS pairs transmitted through the same channel with respect to some antenna ports signaled by the eNB among DM-RS antenna ports of $HP_N(1)$, $HP_N(2)$ $HP_N(n_N)$ and $HP_F(1)$, $HP_F(2) \ldots HP_F(n_F)$ only. Alternatively, the eNB may inform the near UE of the number of DM-RS antenna ports, where the far UE DM-RS transmitted through the same effective channel is present, among DM-RS antenna ports of the near UE.

Additionally, in addition to the method in which an eNB directly signals to a UE whether $P_N$ and $P_F$ are the same, a method in which an eNB indirectly signals to a UE whether $P_N$ and $P_F$ are the same can be considered. The UE may know whether $P_N$ and $P_F$ are the same, using a relation between its DM-RS information and DM-RS information of the far UE data. In this case, the DM-RS information may be one of a DM-RS sequence, nSCID, VCID, DM-RS antenna port. For example, when a DM-RS sequence obtained through BD is equal to its DM-RS sequence, the UE determines that $P_N$ and $P_F$ are the same. Otherwise, the UE determines that $P_N$ and $P_F$ are not the same. Alternatively, when a DM-RS antenna port index obtained through BD overlaps with its DM-RS antenna port index, the UE determines that $P_N$ and $P_F$ are the same. Otherwise, the UE determines that $P_N$ and $P_F$ are not the same.

(2) As the second method, both information on the DM-RS transmitted through the $HP_N$ channel and information on the DM-RS transmitted through the $HP_F$ channel can be received through DCI. In this case, the eNB needs to perform signaling in order for the UE to distinguish between DM-RS information transmitted through the effective channel $HP_N$ and DM-RS information transmitted through the effective channel $HP_F$. Thereafter, the process in which the UE figures out the DM-RS transmitted through the same channel is the same as described above in the examples 1 to 3. Additionally, the eNB may signal to the UE which DM-RS is transmitted through the same channel, and the UE may figure out the DM-RS pair transmitted through the same channel without any additional calculation process.

<CRS Based Transmission Mode>

According to the related art, a total of 6 PMIs consisting of 4 rank-1 PMIs (indices 0 to 3) and 2 rank-2 PMIs (indices 1 and 2) have been defined for closed-loop single user/multi-user MIMO transmission in 2-Tx antenna environment. Thus, although an eNB does not inform a near UE of a far UE's PMI, $P_F$, it is expected that the near UE can figure out $P_F$ through BD.

TABLE 3

| Codebook index | Number of layers v | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

According to the related art, when an interfering cell transmits a PDSCH in 2-TX CRS based transmission mode, a UE can obtain a transmitted PMI of the interference cell through BD. Thus, it is expected that in the case of the MUST transmission, the UE can detect $P_F$ by performing BD in the same manner.

However, the number of PMIs in 4-Tx antenna environment is greater than that in the 2-Tx antenna environment. In the case of the 3GPP LTE Rel-8 PMI, 16 PMIs are present in each rank (that is, 4-bit size PMIs are present). (In the case of the recent 3GPP Rel-12 PMI, although 256 rank-1 PMIs and 256 rank-2 PMIs are present, it is restricted that they are used only in DM-RS based transmission mode.) That is, in the 4-Tx antenna environment, it may be difficult for the UE to detect $P_F$ correctly through BD, and thus a plurality of alternatives can be considered for the $P_F$ detection.

1) Alternative 1

An eNB signals to a near UE far UE's precoding information through DCI. The far UE's precoding information may be defined as a rank and PMI per far UE or the number of total layers of far UEs and a PMI per layer. The difference between the former and the latter will be explained with reference to the following two examples.

As the first example, it is assumed that there is a single rank-2 far UE, which is transmitted according to the MUST scheme. In the former, it is signaled to the near UE that far UE's rank=2 (2 bits) and PMI=x (4 bits). After receiving it, the near UE searches for PMI x from rank-2 PMIs and then assumes the searched PMI x as the far UE's PMI. On the other hand, in the latter, it is signaled that far UE's rank=2 (2 bits) and rank-1 PMI per layer, i.e., two rank-1 PMIs (i.e., rank-1 PMI of the first layer=x1 (4 bits) and rank-1 PMI of the second layer=x2 (4 bits). After receiving it, the near UE searches for rank-1 PMI x1 and rank-1 PMI x2 and then assume the two PMIs as the far UE's PMI.

In the latter, some of far UE's rank-2 PMIs can be signaled to the near UE because only some PMIs among the total 16 rank-2 PMIs are expressed as vector concatenation of two rank-1 PMIs (the vector concatenation of v1 and v2 can be expressed as [v1 v2]). Thus, it may seem that the former has not only low signaling overhead but also more PMIs that can be signaled compared to the latter. However, when there are a plurality of far UEs transmitted according to the MUST scheme, the latter has advantages. Details will be described with reference to the second example.

As the second example, it is assumed that there are two rank-1 far UEs, which are transmitted according to the MUST scheme. In the former, it is signaled to the near UE that far UE1's rank=1 (2 bits) and PMI=x1 (4 bits) and far UE2's rank=1 (2 bits) and PMI=x2 (4 bits). After receiving it, the near UE searches for PMI x1 and PMI x2 from rank-1 PMIs and then assume the PMI x1 and PMI x2 as the far UEs' PMIs. On the other hand, in the latter, it is signaled that far UE's rank=2 (2 bits) and rank-1 PMI per layer, i.e., two rank-1 PMIs (i.e., rank-1 PMI of the first layer (layer of the far UE 1)=x1 (4 bits) and rank-1 PMI of the second layer (layer of the far UE 2)=x2 (4 bits)). After receiving it, the near UE searches for rank-1 PMI x1 and rank-2 PMI x2 and then assume the two PMIs as the far UEs' PMIs. Consequently, when there are a plurality of far UEs transmitted according to the MUST scheme and when the number of layers of each far UE is limited to 1, the latter signaling method has not only lower signaling overhead than the former and but also can transmit all PMIs as in the former.

In the former, ranks of far UEs and payload sizes for PMI signaling can be changed according to the number of UEs, or they may be fixed at the maximum values. In the latter, ranks and payload sizes for PMI signaling can be changed according to total ranks of far UEs, or they may be fixed at the maximum values. Table 4 and Table 5 below show ranks of far UEs and payload sizes for PMI signaling in the former and latter methods. In particular, when the payload sizes are changed, Table 4 shows a payload size for each case and Table 5 shows a payload size for each signaling method.

TABLE 4

| | Case 1: There is a rank-1 far UE | Case 2: There is a rank-2 far UE | Case 3: There are two rank-1 far UEs |
|---|---|---|---|
| The former method | 2 + 4 | 2 + 4 | 2 + 4 + 2 + 4 |
| The latter method | 2 + 4 | 2 + 4 + 4 | 2 + 4 + 4 |

TABLE 5

| | Case 1: There is a rank-1 far UE | Case 2: There is a rank-2 far UE | Case 3: There are two rank-1 far UEs |
|---|---|---|---|
| The former method | 2 + 4 + 2 + 4 | 2 + 4 + 2 + 4 | 2 + 4 + 2 + 4 |
| The latter method | 2 + 4 + 4 | 2 + 4 + 4 | 2 + 4 + 4 |

Consequently, when the number of far UEs transmitted according to the MUST scheme is limited to 1, the former signaling method is advantageous. When the number of far UEs is not limited but when the rank of each far UE is limited to 1, the latter signaling method is advantageous.

2) Alternative 2

An eNB signals a codebook subset restriction (CSR) value of $P_F$ to a near UE, and a UE obtains the value of $P_F$ through BD within a codebook restricted to the CSR. However, in this case, since a far UE has limitation on PMI selection, it is expected that performance of the far UE will be degraded. In addition, since the far UE exists in a low SINR region, the performance degradation due to the limitation imposed on the PMI selection may be significant. Alternatively, as a modification of Alternative 3, after signaling the CSR value of $P_F$ to the near UE, the eNB may select $P_F$ from a set of PMIs satisfying the CSR and then inform the selected $P_F$ through DCI.

3) Alternative 3

To overcome the above-described disadvantage of Alternative 2, an eNB signals to a near UE $P_F$ rather than $P_N$ and a CSR value of $P_N$. In addition, a UE detects the value of $P_N$ through BD within a codebook restricted to the CSR. Unlike Alternative 2, PMI scheduling restriction is imposed on the near UE instead of a far UE in Alternative 3, and thus the near UE obtains its PMI by performing BD within the restricted codebook. Since the near UE exists in a high SINR region, it is determined that performance degradation due to due to the limitation imposed on the PMI selection is lower than that of the far UE.

4) Alternative 4

An eNB signals to a near UE a correlation reference value $\rho$ of $P_F$ and $P_N$, and a UE detects the value of $P_F$ through BD within a codebook restricted with reference to $P_N$ and $\rho$. As a method performed by a UE for restricting a codebook for $P_F$ with reference to $P_N$ and $\rho$, the following can be considered.

A codebook including a precoding vector of which correlation with at least one precoding vector among precoding vectors (or beams) included in the matrix $P_N$ is equal to or greater than $\rho$ A codebook including a precoding vector of which correlation with all precoding vector included in the matrix $P_N$ is equal to or greater than $\rho$ Although the above-described codebook restriction method is selected with reference to values equal to or greater than $\rho$, it may be selected with reference to values equal or smaller than $\rho$ or the value equal to $\rho$. When the value of $\rho$ is set to 1, the eNB always guarantees $P_N = P_F$ through scheduling restriction. As the value of $\rho$ is decreased, the eNB imposes less restriction on scheduling, and thus the calculation amount of BD for the UE to obtain $P_F$ is increased.

Alternatively, the UE may signal to the eNB the value of $\rho$ as UE capability information corresponding to RRC signaling, instead of signaling the value of $\rho$ from the eNB to the UE. After receiving it, the eNB may select $P_F$ within a codebook restricted with reference to $P_N$ and $\rho$, and then use it in performing the MUST transmission for the corresponding UE. That is, the UE expects that the eNB will select $P_F$ within the codebook restricted with reference to $P_N$ and $\rho$, and then use it in performing the MUST transmission for the corresponding UE.

5) Alternative 5

An eNB does not signal to a near UE the value of $P_F$ and related information, and a UE obtains the value of $P_F$ through BD within a restricted codebook. The UE calculates a vector space where precoding vectors included in the matrix $P_N$ are spanned or combined linearly, and then perform BD within a codebook including the precoding vectors existing in the space.

6) Alternative 6

An eNB signals to a near UE whether $P_N$ and $P_F$ are the same. When $P_N$ and $P_F$ are not the same, a UE obtains the value of $P_F$ through BD. That is, Alternative 6 is obtained by applying the method proposed in the above-described DM-RS based transmission mode to the CRS based transmission mode.

In Alternatives 2 to 5, the near UE does not retrieve the entire codebook but performs BD by limiting it to a partial codebook in order to reduce the calculation amount and increase the BD accuracy while performing BD for $P_N$ or $P_F$. Further, when the eNB signals to the near UE $P_N$ or $P_F$, the near UE operates similarly to reduce signaling overhead. That is, instead of selecting $P_N$ or $P_F$ from the entire codebook and then signaling the selected $P_N$ or $P_F$, the eNB can limit the codebook to the partial codebook according to the proposed methods, select $P_N$ or $P_F$ within the limited codebook, and then signal the selected $P_N$ or $P_F$.

The present invention proposes that an eNB signals to a UE whether $P_N$ and $P_F$ are the same. More specifically, the eNB may signal whether $P_N$ and $P_F$ are always the same or they may not be the same. For example, if 1-bit signaling is 0, it could be interpreted to mean that $P_N$ and $P_F$ are always the same. If 1-bit signaling is 1, it could be interpreted to mean that the $P_N$ and $P_F$ may be the same or not. In other words, if 1-bit signaling is 1, it could be interpreted to mean that $P_N$ and $P_F$ are not always the same.

When the eNB signals to the UE whether $P_N$ and $P_F$ are the same, a DCI payload size may be changed according to whether $P_N$ and $P_F$ are the same. When information on whether $P_N$ and $P_F$ are the same is signaled to each UE through RRC signaling, a UE receiving information indicating that $P_N$ and $P_F$ are the same does not need to receive $P_F$ information through DCI and also does not need to perform BD. In this case, it is preferable that the UE receives control information by performing BD on DCI on the assumption of a DCI payload size where the $P_F$ information is not included.

On the other hand, when a UE receives information indicating that $P_N$ and $P_F$ are not always the same, that is, $P_N$ and $P_F$ may be different from each other, it is preferable that the UE performs BD on DCI by assuming a payload size where information on $P_F$ is included. The information on $P_F$ means a precoding vector(s) used by the far UE or a set of precoding vectors that can be used by the far UE. In the latter, the (near) UE should search for the precoding vector(s) used by the far UE by additionally performing BD on the corresponding set.

Figure 9:
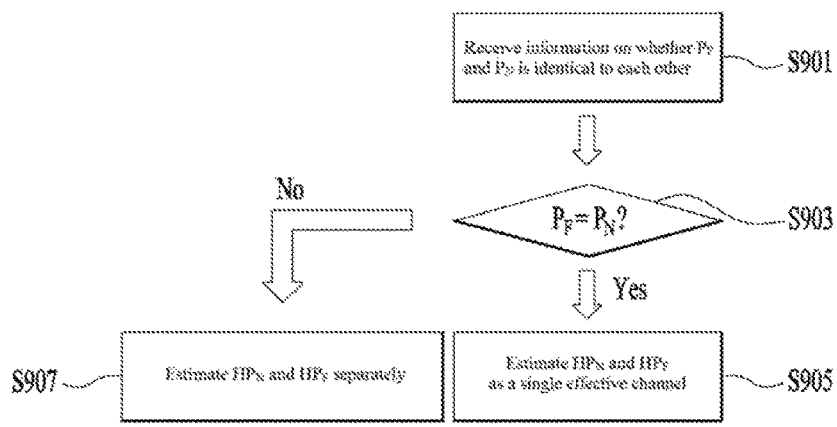
FIG. 9 illustrates an example in which a near UE estimates an effective channel according to the present invention.

FIG. 9 illustrates an example in which a near UE estimates an effective channel according to the present invention. In particular, DM-RS based transmission mode is assumed in FIG. 9.

Referring to FIG. 9, in step 901, a near UE receives information on whether $P_F$ and $P_N$ are identical to each other. In step 903, the near UE determines whether $P_F$ and $P_N$ are identical to each other using the information received in the step S901. In particular, the information on whether $P_F$ and $P_N$ are identical to each other can be explicitly provided by an eNB. Alternatively, it may be provided implicitly. For example, the corresponding information can be provided as follows. First, information on a DM-RS for the near UE and information on a DM-RS for a far UE is provided. Thereafter, if at least one of DM-RS sequences, nSCIDs, VICDs, DM-RS antenna ports included in two parameters are the same, it can be determined that $P_F$ and $P_N$ are the same.

Next, if it is determined in the step 903 that $P_F$ and $P_N$ are the same, the near UE estimates a single effective channel in step 905 using a DM-RS transmitted through an $HP_N$ channel and a DM-RS transmitted through an $HP_F$ channel together to improve channel estimation accuracy.

On the other hand, if it is determined in the step 903 that $P_F$ and $P_N$ are not the same, the near UE should separately estimate corresponding effective channels in step 907 using the DM-RS transmitted through the $HP_N$ channel and the DM-RS transmitted through the $HP_F$ channel together.

Figure 10:
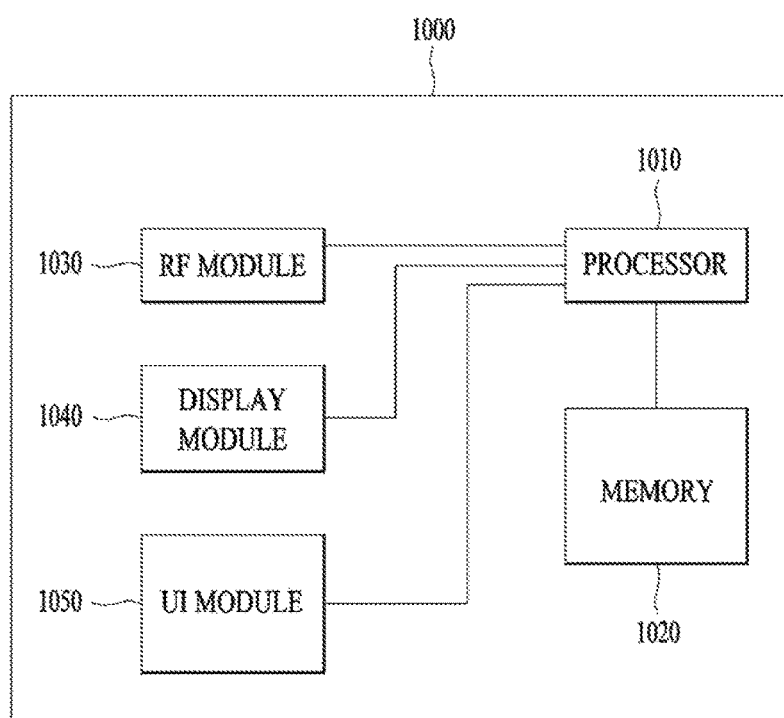
FIG. 10 is a block diagram of a communication apparatus according to an embodiment of the present invention.

FIG. 10 is a block diagram of a communication apparatus according to an embodiment of the present invention.

Referring to FIG. 10, a communication apparatus 1000 includes a processor 1010, a memory 1020, an RF module 1030, a display module 1040, and a User Interface (UI) module 1050.

The communication device 1000 is shown as having the configuration illustrated in FIG. 10, for the convenience of description. Some modules may be added to or omitted from the communication apparatus 1000. In addition, a module of the communication apparatus 1000 may be divided into more modules. The processor 1010 is configured to perform operations according to the embodiments of the present invention described before with reference to the drawings. Specifically, for detailed operations of the processor 1010, the descriptions of FIGS. 1 to 9 may be referred to.

The memory 1020 is connected to the processor 1010 and stores an Operating System (OS), applications, program codes, data, etc. The RF module 1030, which is connected to the processor 1010, upconverts a baseband signal to an RF signal or downconverts an RF signal to a baseband signal. For this purpose, the RF module 1030 performs digital-to-analog conversion, amplification, filtering, and frequency upconversion or performs these processes reversely. The display module 1040 is connected to the processor 1010 and displays various types of information. The display module 1040 may be configured as, not limited to, a known component such as a Liquid Crystal Display (LCD), a Light Emitting Diode (LED) display, and an Organic Light Emitting Diode (OLED) display. The UI module 1050 is connected to the processor 1010 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method for measuring an effective channel for MUST transmission in a wireless communication system and apparatus therefor are mainly described with reference to examples applied to the 3GPP LTE system, the method and apparatus can be applied to various wireless communication systems as well as the 3GPP LTE system.

What is claimed is:

1. A method for estimating a channel by a first user equipment (UE) in a wireless communication system, the method comprising:
    obtaining information on whether a first precoder for the first UE is identical to a second precoder for a second UE;
    when the first precoder is identical to the second precoder, estimating a first effective channel between an evolved node B (eNB) and the first UE and a second effective channel between the eNB and the second UE as a single effective channel; and
    when the first precoder is not identical to the second precoder, separately estimating the first effective channel and the second effective channel.

2. The method of claim 1, wherein estimating the first and second effective channels as the single effective channel comprises:
    obtaining information on a first reference signal for the first UE and information on a second reference signal for the second UE; and
    estimating the single effective channel using the first and second reference signals.

3. The method of claim 1, wherein the information on whether the first precoder is identical to the second precoder is received from the eNB.

4. The method of claim 1, wherein obtaining the information on whether the first precoder is identical to the second precoder comprises:
    obtaining information on a first reference signal for the first UE and information on a second reference signal for the second UE; and
    when the same parameters are configured for the first and second reference signals, determining that the first precoder is identical to the second precoder.

5. The method of claim 1, wherein a signal for the first UE and a signal for the second UE are transmitted using the same time and frequency resources.

6. The method of claim 5, wherein the first UE is located near to the eNB, and wherein the second UE is located far from the eNB.

7. A user equipment (UE) in a wireless communication system, the UE comprising:
    a wireless communication module for transmitting and receiving signals to and from an evolved node B (eNB); and a processor for processing the signals,
wherein the processor is configured to obtain information on whether a first precoder for the UE is identical to a second precoder for a different UE, estimate a first effective channel between the eNB and the UE and a second effective channel between the eNB and the different UE as a single effective channel when the first precoder is identical to the second precoder, and separately estimate the first effective channel and the second effective channel when the first precoder is not identical to the second precoder.

8. The UE of claim 7, wherein the processor is configured to obtain information on a first reference signal for the UE and information on a second reference signal for the different UE and estimate the single effective channel using the first and second reference signals.

9. The UE of claim 7, wherein the information on whether the first precoder is identical to the second precoder is received from the eNB.

10. The UE of claim 7, wherein the processor is configured to obtain information on a first reference signal for the UE and information on a second reference signal for the different UE and determine that the first precoder is identical to the second precoder when the same parameters are configured for the first and second reference signals.

11. The UE of claim 7, wherein a signal for the UE and a signal for the different UE are transmitted using the same time and frequency resources.

12. The UE of claim 11, wherein the UE is located near to the eNB, and wherein the different UE is located far from the eNB.

* * * * *